(12) United States Patent
Hamada et al.

(10) Patent No.: US 6,650,659 B1
(45) Date of Patent: Nov. 18, 2003

(54) DATA TRANSMITTING METHOD

(75) Inventors: Ichiro Hamada, Kanagawa (JP); Hiraku Inoue, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/255,347

(22) Filed: Feb. 23, 1999

(30) Foreign Application Priority Data

Feb. 27, 1998 (JP) .......................... P10-047228
Jul. 16, 1998 (JP) .......................... P10-201731

(51) Int. Cl.[7] ................................ H04J 1/00
(52) U.S. Cl. .................................... 370/487
(58) Field of Search .................. 370/345.1, 465, 370/224, 503, 509, 352, 351, 401, 528, 471, 473, 474, 359, 389, 392; 348/390, 384, 423; 358/342; 369/32, 48, 54, 58, 275.3, 47, 124; 386/1, 46, 111, 125, 95; 381/17, 1, 19

(56) References Cited

U.S. PATENT DOCUMENTS 5,455,684 A * 10/1995 Fujinami et al. ............ 358/335
5,621,840 A * 4/1997 Kawamura et al. ........... 386/68
5,940,352 A * 8/1999 Moriguchi .................... 369/32
6,009,108 A * 12/1999 Takehara et al. ............ 370/538
6,169,843 B1 * 1/2001 Lenihan et al. ............. 370/394
6,356,639 B1 * 3/2002 Ishito et al. ................... 381/17

* cited by examiner

Primary Examiner—Dang Ton
(74) Attorney, Agent, or Firm—Lerner, David, Littenberg, Krumholz & Mentlik, LLP

(57) ABSTRACT

A system and method for transmitting ATRAC data consisting of a plurality of sound groups or record elements (basic elements) in an MPEG stream is disclosed. The ATRAC data is placed in transport stream (TS) packets such that the basic elements of the ATRAC data are kept intact during transmission and errors in transmission are detected. The ATRAC data is transmitted in packetized elementary stream (PES) packets with an amount of ATRAC data (159 bytes) being placed in each TS packet such that an integer number (eight) of TS packets is placed in each PES packet. As a result, an integer number (three) of sound frames of ATRAC data is transmitted in each PES packet. A checksum code also is included in each TS packet to detect errors in the data's transmission.

42 Claims, 13 Drawing Sheets

Fig. 3

| | | |
|---|---|---|
| DATA HEADER | 19 | data_type (audio_data) |
| | 20 | data_transmission_type (satellite) — Tag(10) |

| | | |
|---|---|---|
| | 21 | FDF field length ("1000") — audio_data_type_1 (ATRAC) |
| | 22 | audio_data_type_2 (0000) — copyright — original or_copy — stereo mono — emphasis |
| | 23 | data_start indicator — data_end indicator — PES_data_counter — reserved |

| | | |
|---|---|---|
| DATA BODY (ATRAC) | 24–26 | present_PES_number |
| | 27–29 | reserved |
| | 30–188 | ATRAC_data (159 bytes) |

Fig. 5

ATRAC DATA CHECKSUM

| | CS[0] | CS[1] | CS[2] | CS[3] | CS[4] | CS[5] | CS[6] | CS[7] |
|---|---|---|---|---|---|---|---|---|
| 29 | | | | | | | | |
| 30 | AT[0][0] | AT[0][1] | | | | | | AT[0][7] |
| | AT[1][0] | | | | | | | |
| | AT[2][0] | | | | | | | |
| 188 | AT[158][0] | | | | | | | AT[158][7] |

DATA TRANSMITTING METHOD

FIELD OF THE INVENTION

The present invention relates to a data transmitting method suitable for a system that transmits music data through a satellite broadcast.

BACKGROUND OF THE INVENTION

Digital satellite broadcast services have become common. In digital satellite broadcast services, signals are transmitted in higher quality than conventional analog broadcasts. In addition, since the frequency efficiency of digital broadcasts is high, many programs can be broadcast on many channels. For example, in digital satellite broadcast services, one satellite can provide several hundred channels. Thus, digital satellite broadcast services provide their subscribers with special channels for sports, movies, music, news, and so forth. These services broadcast special programs 24 hours a day. Among the special channels, music channels are among the more popular channels. On a music channel, a new song release guide and a hit chart can be broadcast using both video and audio data.

When the subscriber listens to a music program on a music channel, he or she may want to buy a compact disc (CD) of a song that is being broadcast. In such a case, if the subscriber could download music data of the song from the music channel, it would be very convenient. To satisfy this need, the assignee of the present invention has proposed a system that broadcasts a music program as digital audio data through a satellite, circulates the digital audio data corresponding to the music program, and allows the subscriber to purchase the music data.

When music data is broadcast and circulated through a satellite, if audio data is directly transmitted, the amount of data is extremely large and, therefore, the time for transmission is long. To solve this problem, the audio data can be compressed. An example of audio data compressing is the ATRAC (Adaptive Transform Acoustic Coding) technique. This technique has been used for compressing and recording audio data for an MD (Mini Disc). When audio data is compressed in the ATRAC format, the transmission rate for the music data can be decreased. In addition, circulated music data can be directly recorded on an MD.

Data in the ATRAC format is segmented into basic elements, each of which consists of 424 bytes of data. Each basic element is referred to as a sound group or a sound frame. One sound group is one record element. If ATRAC data is broadcasted and circulated through a satellite, it would be preferable if the data could be transmitted in such a manner that the sound groups are not broken up.

In the ATRAC format, audio data is digitized at a sampling frequency of 44.1 kHz with 16 quantizing bits. The resultant audio data is extracted with a time window of 11.61 msec. The extracted audio data is compressed to 1/5 of the original data with modified DCT (Discrete Cosine Transform).

When audio data that has been digitized at a sampling frequency of 44.1 kHz with 16 quantizing bits is extracted with a time window of 11.61 msec, the number of samples is 512. Thus, since there are 8 bits in each byte of data, the amount of audio data in the time window of 11.61 msec is:

$512 \times 2 = 1024$ bytes.

The total of the data amount on the left and right channels becomes:

$1024 \times 2 = 2048$ bytes

In the ATRAC format, with modified DCT data, data of 2048 bytes is compressed to data of 424 bytes. As indicated above, the ATRAC data of 424 bytes is referred to as a sound group or a sound frame, and one sound group is one record element of compressed audio data in the ATRAC format. Since data of 2048 bytes is compressed to data of 424 bytes, the compressing ratio using the ATRAC technique is around 1/5.

In the ATRAC format, a sound group of 424 bytes, equivalent to audio compressed data in a period of 11.61 msec, is one element of audio compressed data. When ATRAC audio data is transmitted, sound groups should be kept intact.

In a satellite broadcast, data is transmitted in the MPEG format (Moving Picture Experts Group). In the MPEG format, video data, audio data, and other data are placed on fixed length packets (188 bytes each). These packets are referred to as transport packets (TS packets). The packets are multiplexed on the same stream. Thus, when ATRAC audio data is transmitted with an MPEG stream, the ATRAC audio data must be placed on a TS packet of 188 bytes.

However, there is no relation between 424 bytes of one ATRAC sound group and 188 bytes of one TS packet. Thus, when ATRAC data is simply assigned to TS packets and the resultant data is transmitted, the sound groups are broken up. Consequently, it becomes difficult to perform an ATRAC demodulating process and an ATRAC recording process.

Therefore, an object of the present invention is to provide a data transmitting method for effectively transmitting data on an MPEG stream with PES (Packetized Elementary Stream) packets while basic elements of the underlying data are kept intact, each basic element having a predetermined data amount.

Another object of the present invention is to allow a receiving apparatus or a storage device that downloads data to check an error in transmission so as to verify the reliability of the transmission data.

SUMMARY OF THE INVENTION

To solve the above-described problem, the present invention provides a method for transmitting data (transmission information) in elementary stream packets (PES packets). The data comprises a plurality of data segments (basic elements), and each of the data segments contains a predetermined quantity of data. The method comprises forming each elementary stream packet with an integer number of transport stream packets (TS packets), and forming each transport stream packet with a quantity of the data such that an integer number of data segments is contained in each elementary stream packet. The data preferably is compressed audio data, and one data segment is preferably one sound frame or one sound group.

In accordance with the present invention, when ATRAC data is transmitted in PES packets, 159 bytes of the ATRAC data are placed in each TS packet, and one PES packet is formed with eight (8) TS packets. Thus, with one PES packet, three (3) sound frames of ATRAC data are transmitted. Consequently, one PES packet is formed with an integer number (eight) of TS packets and an integer number (three) of sound frames of ATRAC data. Since an integer number of sound frames is transmitted with each PES packet, the integrity of sound frames and PES packets is preserved.

In a preferred embodiment, the transmission information within each TS packet includes an error detection code or an error correction code. Thus, a receiving apparatus or a storage device can check for an error in the transmission information.

In the data transmitting method according to the present invention, unique information with respect to the transmission information preferably is placed in each TS packet. This unique information may contain, e.g., information representing that the current transmission data is the first PES packet, and information representing that the current transmission data is the last PES packet. Thus, the record start position and the record end position can be easily detected.

In addition, the unique information may include information representing that the current transmission data is at a particular TS packet in the PES packet. Thus, it can be determined whether data has been lost. Corresponding to the determined result, an error process can be performed.

BRIEF DESCRIPTION OF THE DRAWINGS

FIG. 3 is a schematic diagram of a packet structure of a data body in which ATRAC data is transmitted according to the present invention.

FIG. 5 is a schematic diagram of an error detection code placed in a data body according to the present invention.

DESCRIPTION OF THE PREFERRED EMBODIMENTS

According to the present invention, audio data compressed in the ATRAC format is transmitted with a stream of MPEG data (ISO/IEC 13818-1 GENERIC CODING OF MOVING PICTURES AND ASSOCIATED AUDIO SYSTEMS Recommendation H.222.0).

In the MPEG technique, a plurality of programs are multiplexed and transmitted with transmission elements referred to as transport stream packets (TS packets). The data length of each TS packet is 188 bytes (fixed). With audio data compressed in the ATRAC format, one sound group of 424 bytes of ATRAC data should be kept intact. There is no relationship between the data size of one TS packet (188 bytes) and the data size of one sound group (424 bytes) of ATRAC data. Thus, when ATRAC data is transmitted with an MPEG stream, the conformity of the data deteriorates.

Figure 1A:
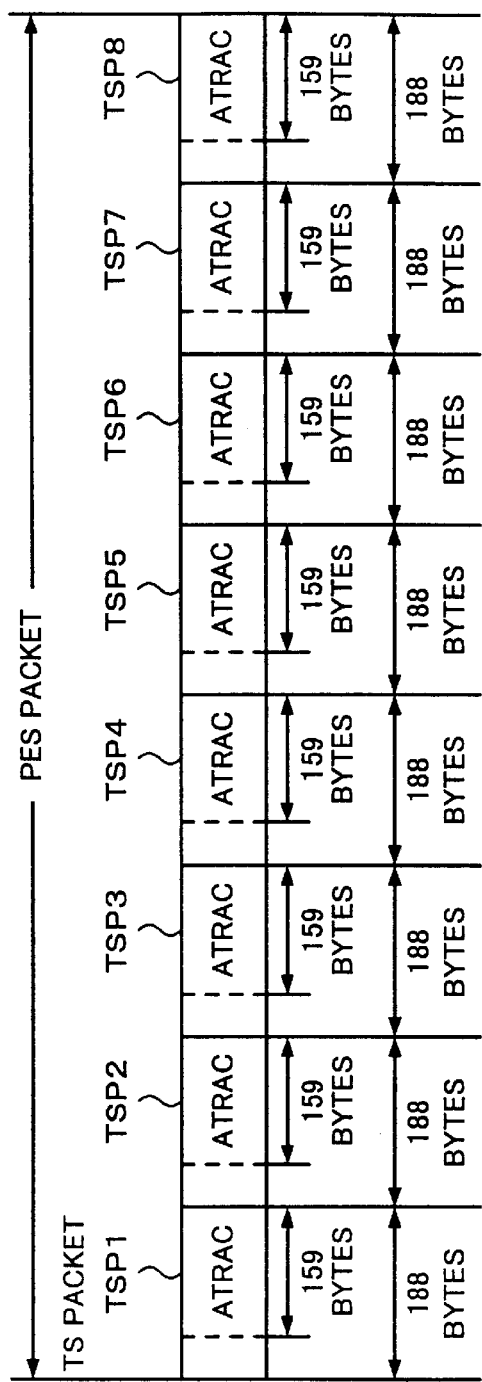
FIG. 1 is a schematic diagram of a packet structure in a data transmitting method according to an embodiment of the present invention.

Thus, in an embodiment of the present invention, as shown in FIG. 1A, audio data of 159 bytes that has been compressed in the ATRAC format is placed in each of TS packets TSP1 to TSP8. With the eight TS packets TSP1 to TSP8, one elementary stream packet or PES (Packetized Elementary Stream) packet is formed.

Thus, when ATRAC data of 159 bytes is placed in one TS packet and one PES packet is formed with eight TS packets, the data size of one PES packet becomes:

159 bytes×8=1272 bytes

Figure 1B:
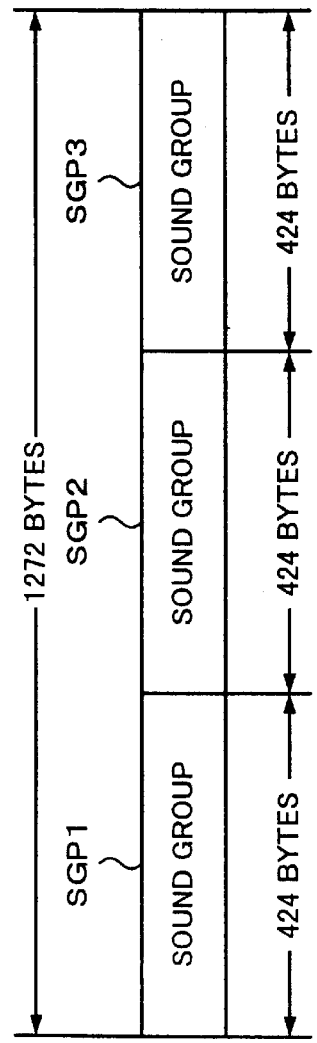

Since the data size of one sound group is 424 bytes, as shown in FIG. 1B, data of 1272 bytes transmitted with one PES packet is equivalent to the data of three sound groups SGP1 to SGP3.

424 bytes×3=1272 bytes

When ATRAC data of 159 bytes is placed in one TS packet and one PES packet is formed with eight TS packets, data of three sound groups can be transmitted with one PES packet. Since data of an integer number of sound groups is transmitted with one PES packet, the integrity of the ATRAC data is preserved.

When ATRAC data is transmitted, 159 bytes of 188 bytes (fixed) of each TS packet is used. The remaining 29 bytes of the TS packet are used for a TS packet header, a PES header, and a data header. The data header includes information of the type of transmission data and the type of transmission path, such as a satellite broadcast or a ground wave broadcast. Moreover, an FDF (Field Dependent Field) of seven bytes is included. The FDF defines information unique to the ATRAC data.

In the transmitting method according to the present invention, when ATRAC data is transmitted, ATRAC data of 159 bytes is placed in one TS packet. In addition, a data header and an FDF are placed in each TS packet. With eight TS packets, one PES packet is formed. With one PES packet, data of three sound groups is transmitted.

An example of transmitting ATRAC data with PES packets in accordance with the present invention is described below.

Figure 2:
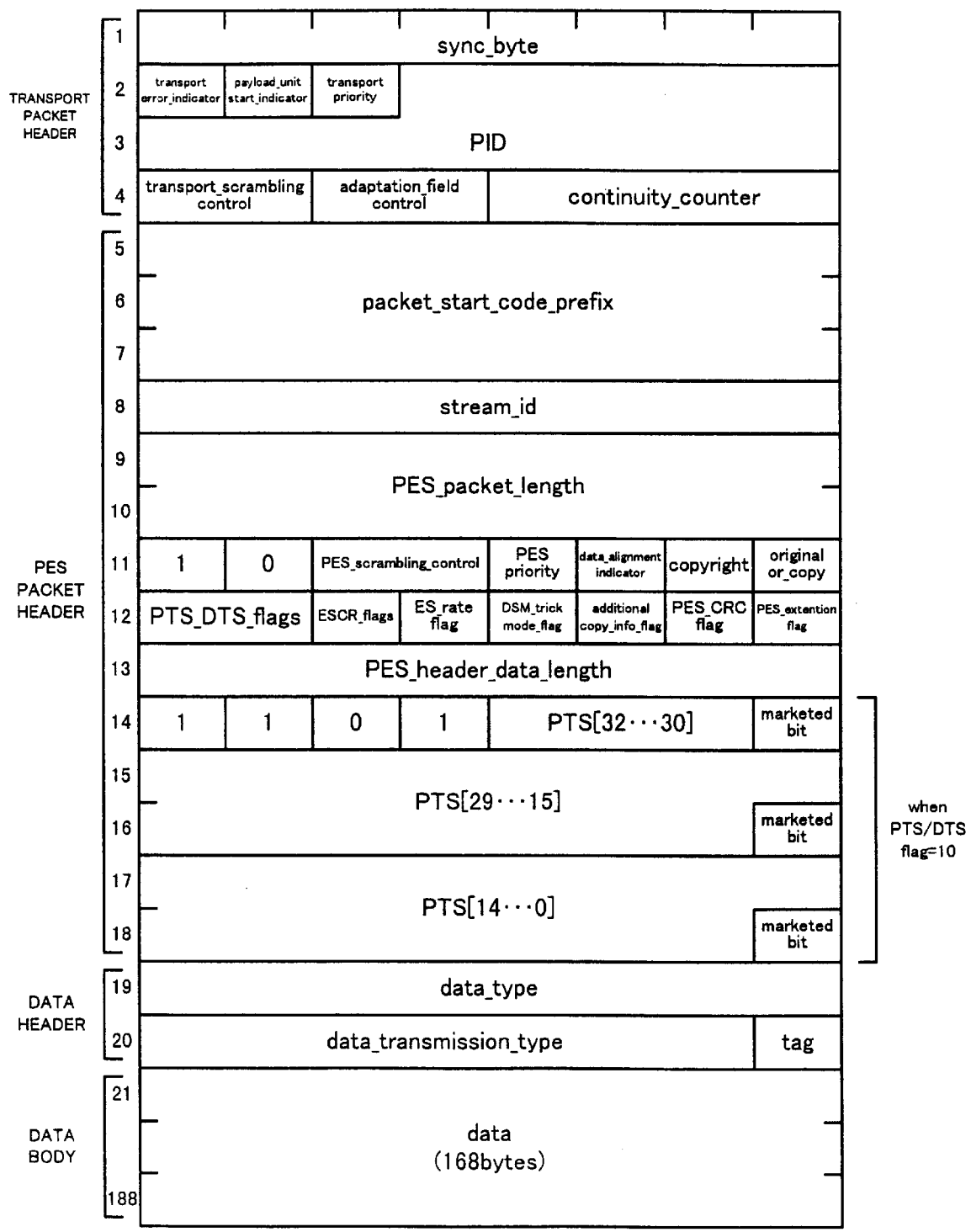
FIG. 2 is a schematic diagram of a packet structure in which ATRAC data with a PTS is transmitted according to the present invention.

FIG. 2 shows the structure of a TS packet that is synchronously transmitted with a PTS (Presentation Time Stamp). As shown in this figure, the data length of one TS packet is 188 bytes (fixed). The area defined by the first byte through the fourth byte of the TS packet is used for a transport packet header. The area defined by fifth byte through the 18-th byte of the TS packet is used for a PES packet header. The area defined by the 19-th byte through the 20-th byte of the TS packet is used for a data header. The area defined by the 21-st byte through the 188-th byte of the TS packet is used for the data body. FIG. 3 shows the structure of the data body in greater detail.

As shown in FIG. 2, a sync byte of one byte is placed at the beginning of the transport packet header. The sync byte is followed by a transport error indicator of one bit, a payload unit start indicator of one bit, and a transport priority of one bit. The transport error indicator represents whether the current packet has an error. The payload unit start indicator indicates whether a new PES packet starts from the payload of the current transport packet. The transport priority represents the importance of the current packet. The transport priority is followed by stream identification information (PID) of 13 bits. The stream identification information (PID) represents the attribute of a discrete stream of the current packet. The PID is followed by a transport scrambling control, an adaptation field control, and a continuity counter. The transport scrambling control represents whether the payload of the current packet has been scrambled and represents the scrambling type. The adaptation field control represents whether the adaptation field is present. The continuity counter represents whether a packet with the same PID has been partly discarded during the transmission.

At the beginning of the PES packet header (fifth byte to 18-th byte), a packet start code prefix of three bytes (24 bits) (fixed) is placed. The packet start code prefix is followed by a stream ID of eight bits. The stream ID is used to identify the current stream. The stream ID is followed by a PES packet length of two bytes. The PES packet length represents the length of the current PES packet. The PES packet length is followed by a fixed pattern "10", a PES scramble control of two bits, a PES priority of one bit, a data alignment indicator of one bit, a copyright of one bit, an original/copy identification of one bit, a PTS and DTS flag of two bits, an ESCR flag of one bit, an ES rate flag of one bit, a DMS trick mode flag of one bit, an additional copy information flag of one bit, a PES CRC flag of one bit, and a PES extension flag of one bit. The PES extension flag is followed by a PES header data length of eight bits. The PES header data length is followed by a fixed pattern "1101". The fixed pattern "1101" is followed by a time stamp PTS 32-30. The time stamp PTS 32-30 is followed by a marketed bit of one bit. The marketed bit is followed by a time stamp PTS 29-15 of 15 bits. The time stamp PTS 29-15 is followed by a marketed bit of one bit. The marketed bit is followed by a time stamp PTS 14-0 of 15 bits. The time stamp PTS 14-0 is followed by a marketed bit of one bit.

At the data header (19-th byte to 20-th byte), a data type of eight bits, a data transmission type of six bits, and a tag of two bits are placed. The data type represents the type of data being transmitted. The data transmission type represents the type of data transmission path such as a satellite broadcast or a ground wave broadcast. The tag represents whether the data header is followed by an additional header. For example, when the tag is "00", the data header is followed by data. When the tag is "01", the data header is followed by an additional header. When the tag is "10", there are a plurality of additional headers in the current PES packet.

The 21-st to 188-th byte are used for a data body. The arrangement of ATRAC data placed in the data body is shown in FIG. 3. As shown in this figure, at the first four bits of the 21-st byte of the data body, a FDF field length is placed. The FDF field length represents the length of the FDF field. The FDF field length is followed by an audio data type 1 of four bits. The audio data type 1 defines the audio type (for example, ATRAC). The audio data type 1 is followed by an audio data type 2. The audio data type 2 defines a category of the data type (for example, ATRAC1 or ATRAC2). The audio data type 2 is followed by copyright information of one bit, original/copy information of one bit, stereo/mono information of one bit, and emphasis information of one bit.

The emphasis information is followed by a data start indicator of one bit, a data end indicator of one bit, and a PES data counter of three bits. The data start indicator represents that the current transmission data is the first PES packet of music data. The data start indicator is "1" in the eight TS packets of a PES packet containing the start portion of a song of ATRAC data. The data end indicator represents that the current transmission data is the last PES packet of the music data. The data end indicator is "1" in the eight TS packets of a PES packet containing the end portion of a song of ATRAC data.

The PES data counter represents that the current transmission data is at what TS packet of the current PES packet. The PES data counter is followed by a reserved area of three bits. The reserved area is followed by a present PES number of 24 bits. The present PES number represents that the current transmission data is at what PES packet. Thus, corresponding to the present PES number and the PES data counter, the continuity of each TS packet can be determined. This means that the continuity of ATRAC data placed in TS packets also can be determined.

In the example shown in FIG. 3, the area defined by the 27-th byte through the 29-th bytes is used for a reserved area. The reserved area is followed by ATRAC data of 159 bytes (30-th byte to 188-th byte).

Figure 4:
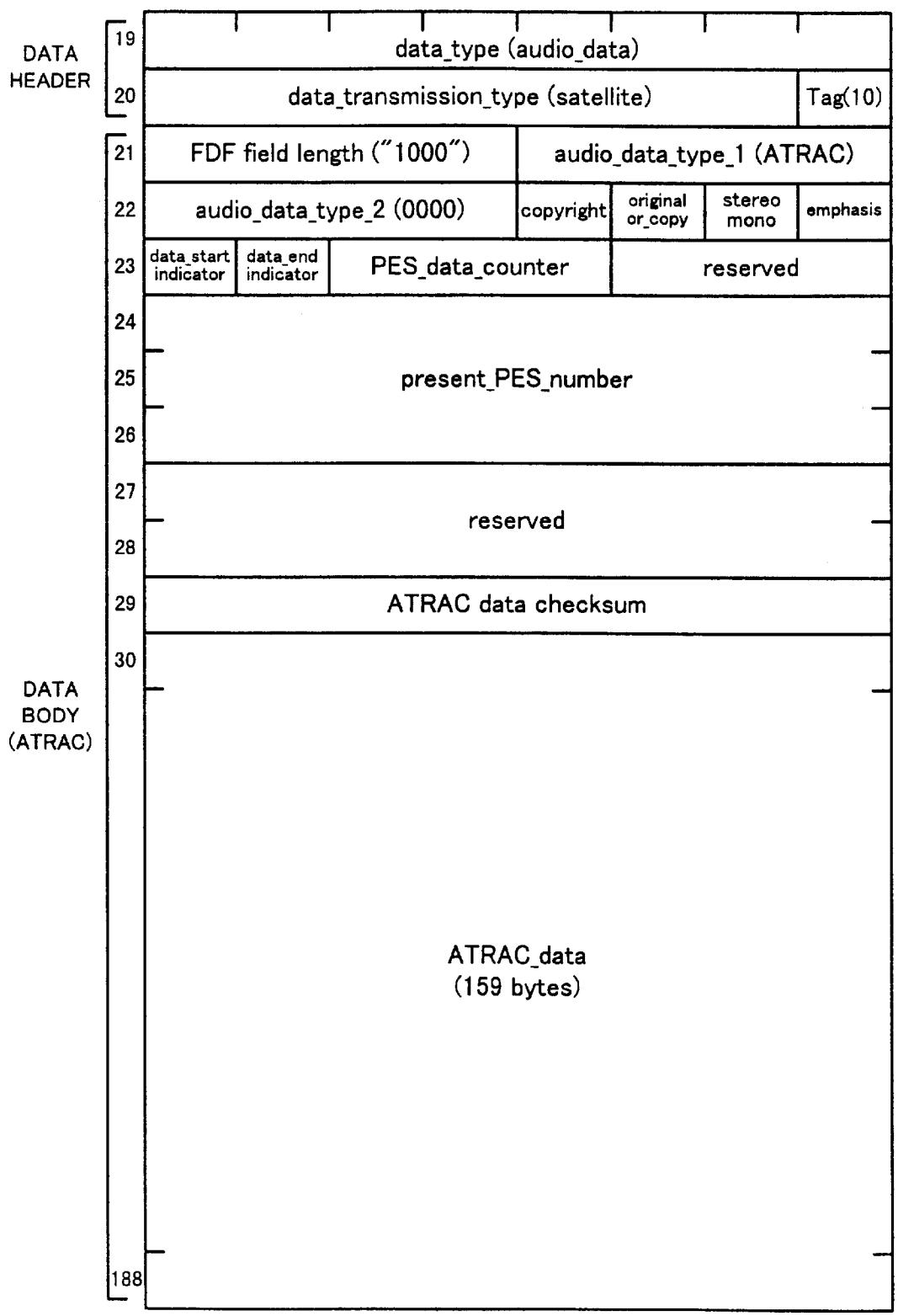
FIG. 4 is a schematic diagram of a packet structure of a data body in which ATRAC data is transmitted according to the present invention.

An alternative format of the data body according to the present invention is shown in FIG. 4. The format shown in FIG. 4 is almost the same as the format shown in FIG. 3. However, as shown in FIG. 4, only the 27-th byte and the 28-th byte are reserved. At the 29-th byte, an ATRAC data checksum (CRC error detection code) is placed. As with the format shown in FIG. 3, at the 30-th byte to the 188-th byte, ATRAC data of 159 bytes is placed.

FIG. 5 shows the relation between ATRAC data checksum (29-th byte) and ATRAC data. The ATRAC checksum is calculated in the following manner. Assuming that the bit values for the ATRAC data checksum are denoted by CS [0] to CS [7], the values of the first bit of the ATRAC data of 159 bytes are denoted by AT [0] [0], and the values of the last bit thereof are denoted by AT [158] [7], the following relations are satisfied, CS[0]^AT[0][0]^AT[1][0]^ . . . ^AT[158][0]=SUM[0]
CS[1]^AT[0][1]^AT[1][1]^ . . . ^AT[158][1]=SUM[L] . . .
CS[7]^AT[0][7]^AT [1][7]^ . . . AT [158][7]=SUM [7], the values of CS [0] to CS [7] are set so that SUM [0]~SUM [7]=0x00.

With the above-described ATRAC data checksum, the reliability of downloaded ATRAC data can be checked on the receiving side (for example, an IRE 22) or in a storage device side (for example, device 23). The details of the IRE 22 are described below.

As described above, ATRAC data of 159 bytes is placed in one TS packet. In addition, unique information is defined and placed in the FDF. The FDF area is at a predetermined position of the TS packet so that signal processes can easily be performed corresponding to the additional data header, ATRAC data, and the FDF data that are received.

Thus, corresponding to the FDF, data of a song transmitted with one TS packet can be analyzed. Consequently, even if an error takes place during data transmission and thereby a particular packet is lost, it can be detected. In addition, corresponding to the data start indicator and the data end indicator, the beginning and end of a song can be detected. With the data start indicator and the data end indicator, when data is downloaded by a storage device, the record start position and the record end position can be easily detected.

Figure 6:
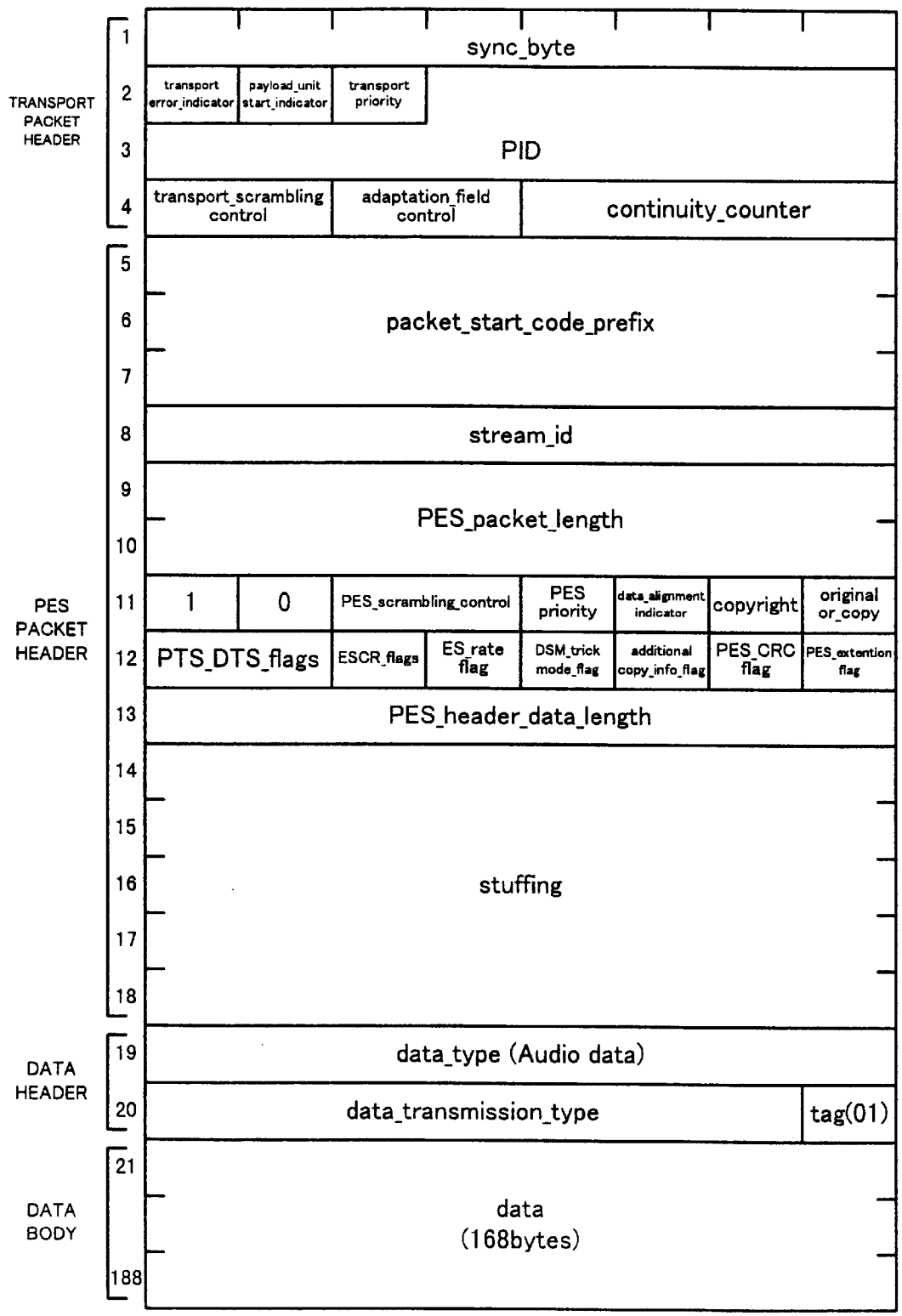
FIG. 6 is a schematic diagram of a packet structure of the first packet in which ATRAC data without a PTS is being transmitted according to the present invention.
Figure 7:
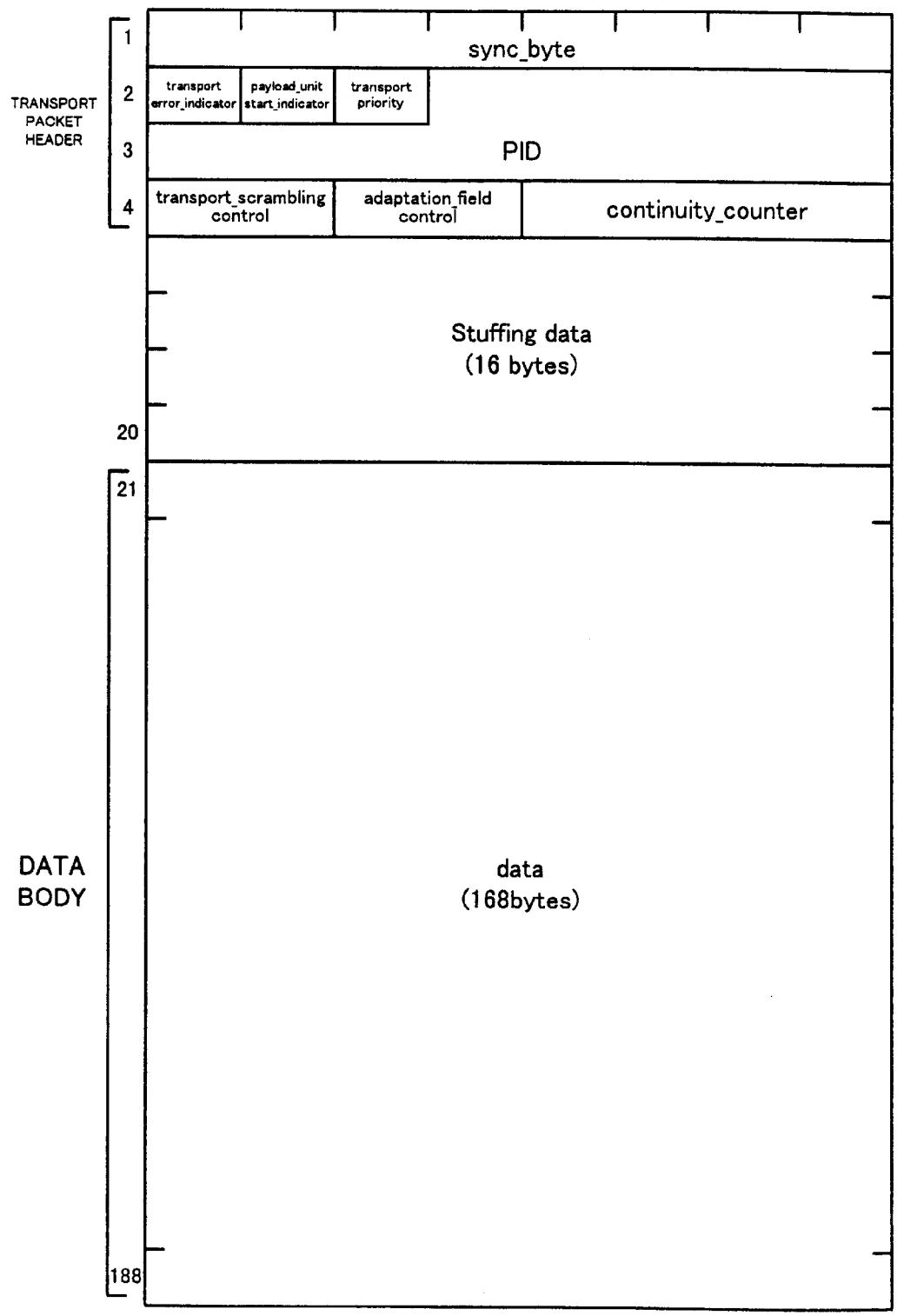
FIG. 7 is a schematic diagram of a packet structure for each of the second through the eighth packets in which ATRAC data without a PTS is being transmitted according to the present invention.

Next, the transmission of data, in accordance with the invention, at high speed without a synchronous PTS will be described. FIGS. 6 and 7 show the structure of a TS packet in data which is transmitted without a synchronous PTS. FIG. 6 shows the structure of the first TS packet of eight TS packets that compose one PES packet. FIG. 7 shows the structure of the second to eighth TS packets.

As shown in FIG. 6, the data length of the first TS packet is 188 bytes (fixed). The area from the first byte to the fourth byte of the TS packet is used for a transport packet header. The area from the fifth byte to the 18-th byte of the TS packet is used for a PES packet header. The area from the 19-th byte to the 20-th byte of the TS packet are used for a data header. The area from the 21-st byte to the 188-th byte of the TS packet is used for a data body.

The format of the transport packet header shown in FIG. 6 is the same as the format shown in FIG. 2. In the PES packet header (fifth byte to 18-th byte), the format from a packet start code prefix of 24 bites (fixed) to a PES header data length of eight bits (13-th byte) is the same as the format shown in FIG. 2. However, in the format shown in FIG. 6, the PES header data length is followed by five stuffing bytes (meaningless data).

In the data header (19-th byte to 20-th byte), a data type of eight bits, a data transmission type of six bits, and a tag of two bits are placed. The area from the 21-st byte to the 188-th byte is used for a data body. ATRAC data is placed in the data body. The arrangement of the ATRAC data is the same as that of the structure shown in FIG. 4.

As shown in FIG. 7, as with the structure of the TS packet shown in FIG. 2, in each of the second to the eighth TS packets of 188 bytes each, the first byte to the fourth bytes are used for a transport packet header. The area from the 21-st byte to the 188-th byte is used for a data body.

The structure of the transport packet header of each of the second to the eighth TS packets is the same as that of the TS packet shown in FIG. 2. The structure of the data body of each of the second to the eighth TS packets is the same as that of the TS packet shown in FIG. 4.

The area from the fifth byte to the 20-th byte of each of the second to the eighth TS packets is used for stuffing bits rather than the PES packet header.

In the high speed transmission format described with reference to FIGS. 6 and 7, since a synchronous PTS is not added to each TS packet, a predetermined PES packet header is placed in the first TS packet of the PES packet. The PES packet header is not placed in the second to the eighth TS packets.

Figure 8:
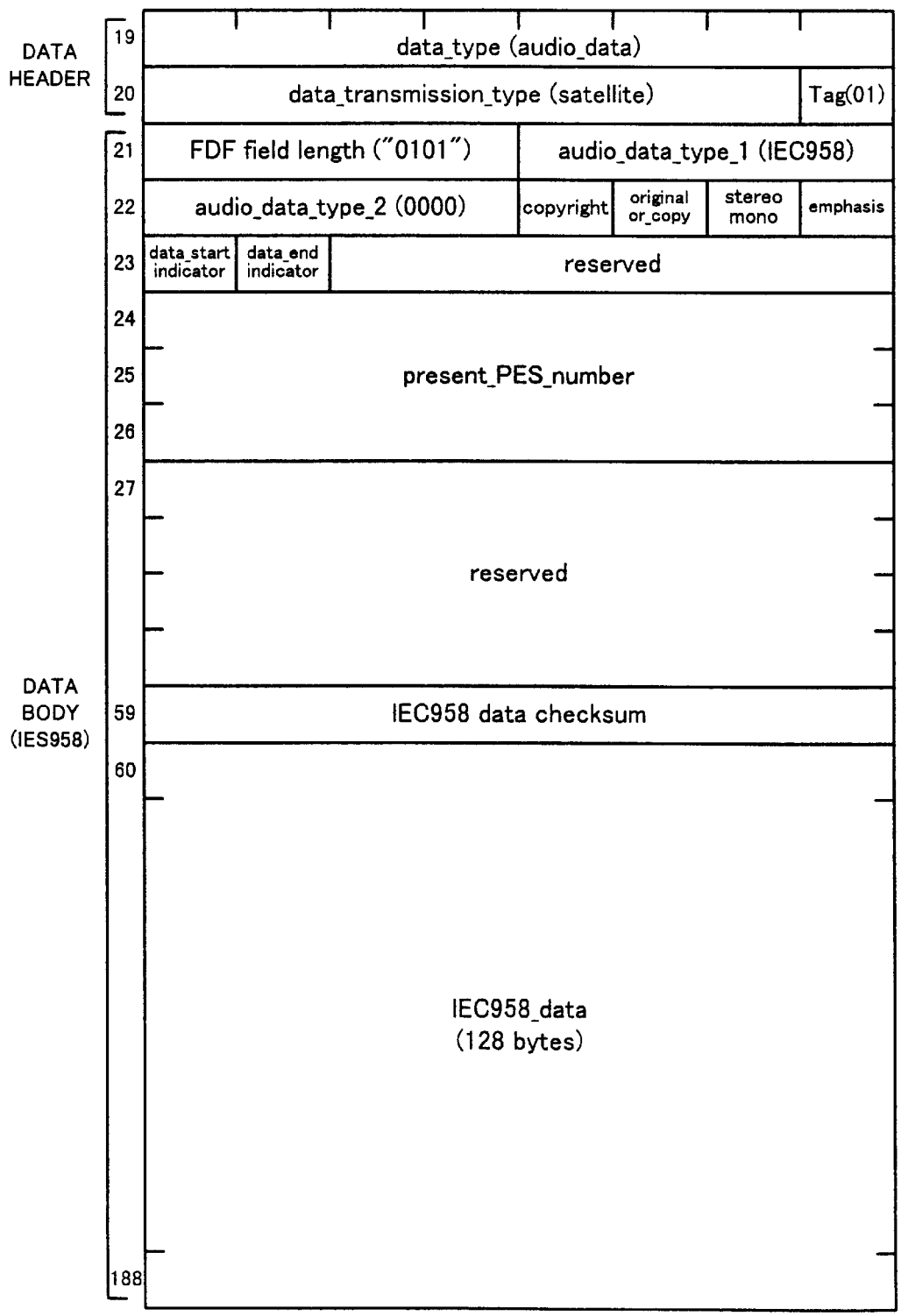
FIG. 8 is a schematic diagram of a packet structure of a data body in which data corresponding to a digital interface is being transmitted according to the present invention.

In the above-described example, ATRAC data is transmitted with MPEG packets. However, the present invention is not limited to such a format. FIG. 8 shows an example of the transmission, in accordance with the present invention, of data formatted in accordance with the IEC958 standard. In this case, data of 3072 bytes is placed in one PES packet. Thus, two frames of IEC958 data can be transmitted with one PES packet.

When IEC958 data is transmitted, the IEC958 data is arranged as shown in FIG. 8. As shown in FIG. 8, at the first four bits of the data body (21-st byte to 188-th byte), an FDF field length is placed. The FDF field length is followed by an audio data type 1 of four bits. The audio data type 1 is followed by an audio data type 2. The audio data type 2 is followed by a copyright of one bit, an original/copy of one bit, a stereo/mono of one bit, and an emphasis of one bit. The emphasis is followed by a data start indicator of one bit and a data end indicator of one bit. The data end indicator is followed by a reserved area of six bits. The reserved area is followed by a present PES number (24-th byte to 26-th byte).

The present PES number is followed by a reserved area (27-th byte to 58-th byte). The reserved area is followed by an IEC958 data checksum (CRC error detection code). The IEC958 data checksum is followed by IEC958 data of 128 bytes (60-th byte to 188-th byte). Since 128 bytes of data are paced in one TS packet, the integrity of IC958 data and PES packets is preserved.

As described above, when ATRAC data is transmitted with PES packets, if ATRAC audio data of 159 bytes is placed in one TS packet, data of three sound groups can be transmitted with one PES packet. Thus, the conformity of ATRAC data and PES packets improves. In a satellite broadcast, data is transmitted in the MPEG format. In a system that transmits music data through a satellite broadcast, the music data is compressed in the ATRAC format. When such a system transmits music data, it is preferred to place ATRAC data in each PES packet in the above-described manner.

Next, a system which circulates music data through a satellite broadcast will be described.

Figure 9:
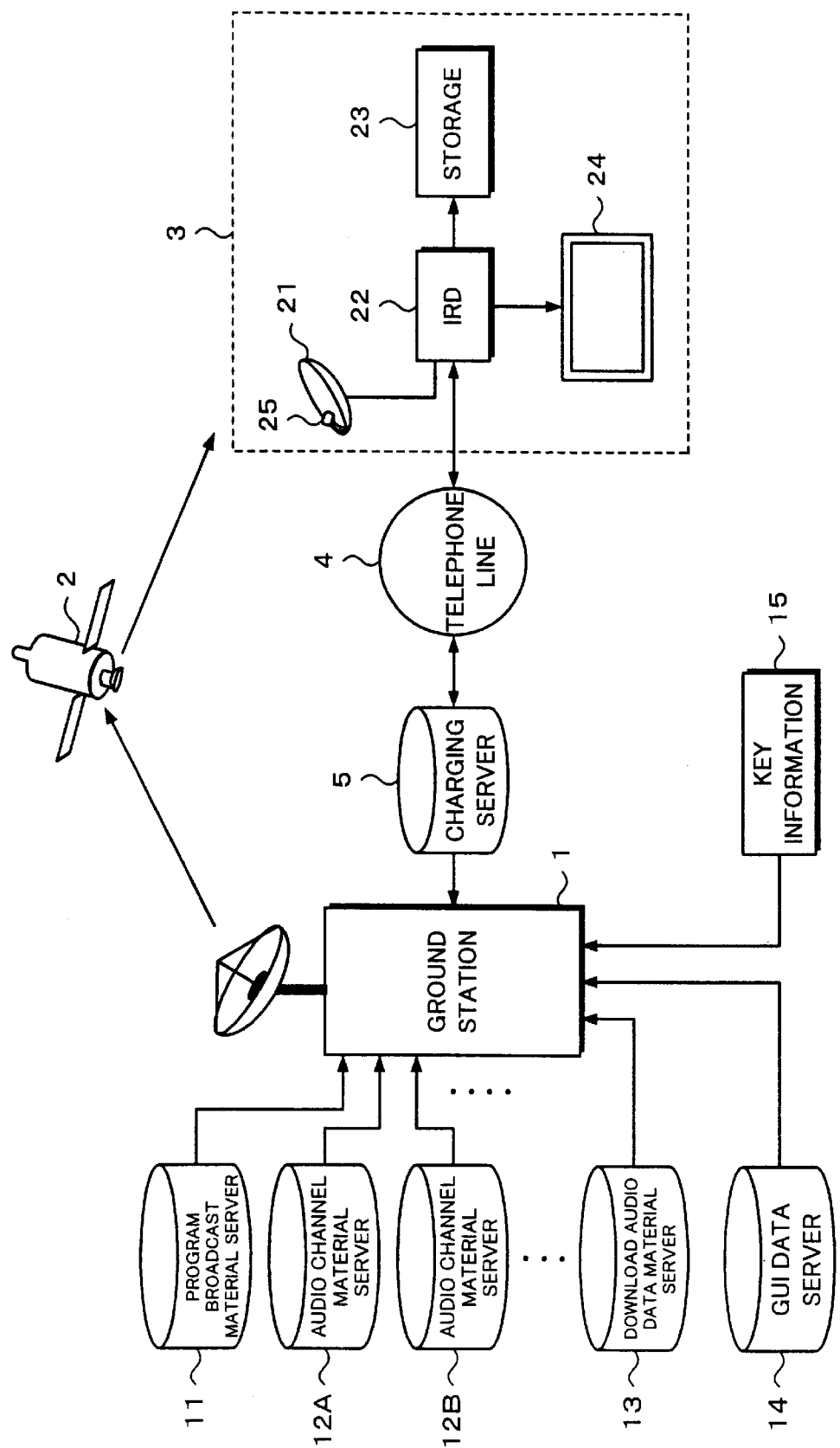
FIG. 9 is a block diagram showing an overall structure of a satellite broadcasting system for transmitting music data.

FIG. 9 shows the overall structure of a system that circulates music data through a satellite broadcast. In FIG. 9, reference numeral 1 is a ground station of a satellite broadcasting system. A program broadcast material server 11 supplies the material for a music program to the ground station 1. Audio channel program broadcast material servers 12A, 12B and so forth supply materials for audio channels to the ground station 1. A download audio data material server 13 supplies download data to the ground station 1. A GUI data server 14 supplies graphic user interface screen data to the ground station 1.

The program broadcast material server 11 is a server that provides materials of conventional music broadcast programs. The materials of music broadcast programs transmitted from the program broadcast material server 11 are moving picture data and audio data. In a conventional music broadcast program, a promotion video program for new songs and a new hit chart count-down program are broadcast.

The audio channel program broadcast material servers 12A, 12B, and so forth are servers that provide audio programs on audio channels. The audio channel program broadcast materials are only audio data. In each audio channel program broadcast, the same song is repeatedly broadcast at intervals of a predetermined time period. The song relates to a download song (described later). Each audio channel is independent and can be used in various manners. For example, on one audio channel, a new Japanese pop song is repeatedly broadcast at intervals of a predetermined time period. On another audio channel, a new American pop song is repeatedly broadcast at intervals of a predetermined time period. On a further audio channel, a new jazz song is repeatedly broadcast at intervals of a predetermined time period. Alternatively, a plurality of songs of the same artist may be broadcast on different audio channels.

The download audio data material server 13 provides a plurality of download audio programs. The download audio programs relate to songs broadcast on audio channels. For example, as described above, on one audio channel, a new Japanese pop song is repeatedly broadcast at intervals of a predetermined time period. On another audio channel, a new American pop song is repeatedly broadcast at intervals of a predetermined time period. On a further audio channel, a new jazz song is repeatedly broadcast at intervals of a predetermined time period. In this case, the new Japanese pop song, the new American pop song, and the new jazz song are provided as download audio data.

The GUI (Graphic User Interface) data server 14 provides data for forming a screen for a page of a circulated program list, a screen of a page for each song information page, a screen of an EPG (Electric Program Guide), and so forth. A list of download programs and the related information can be displayed on the screen of a monitor. The GUI data server 14 supplies such data to the ground station 1.

The ground station 1 multiplexes video data and audio data as music program broadcast material received from the program broadcast material server 11, audio data from the audio channel materials received from the audio channel program broadcast material servers 12A, 12B, and so forth, download data received from the download audio data material server 13, and data received from the GUI data server 14 and transmits the multiplexed data. At this point, video data for a broadcast music program is compressed in the MPEG2 video format (Moving Picture Experts Group 2), and audio data on each audio channel is compressed in the MPEG audio format. Download audio data is compressed with the ATRAC format (Adaptive Transform Acoustic Coding). In addition, the download audio data is encrypted with key information received from a key information server 15.

A signal transmitted from the ground station 1 is received by a receiving facility 3 of each family through a satellite 2. The satellite 2 is equipped with a plurality of transponders.

The receiving facility 3 of each end user comprises a parabolic antenna 21, an IRD (Integrated Receiver Decoder) 22, a storage device 23, and a television receiver 24. The parabolic antenna 21 receives a signal through the satellite 2. An LNB (Low Noise Block Down-converter) 25 (FIG. 12) disposed in the parabolic antenna 21 converts the frequency of the received signal into a predetermined frequency. The resultant signal is supplied to the IRD 22.

The IRD 22 selects a signal of a predetermined channel from the received signal and demodulates the signal into a video signal and an audio signal. In addition, the IRD 22 forms a page of a list of circulated songs, song information pages, and an EPG screen. An output signal of the IRD 22 is supplied to the television receiver 24.

The storage device 23 stores audio data that has been downloaded. An example of the storage device 23 is a mini disc (MD) recorder/player.

The IRD 22 is connected to a charging server 5 through, for example, a telephone line 4. A user's card 88 (FIG. 12) containing an integrated circuit (IC) for recording various information is inserted into the IRD 22. When audio data is downloaded, the occurrence is recorded on the IC card. The information recorded on the IC card is transmitted to the charging server 5 through the telephone line 4. The charging server 5 charges the subscriber for the downloaded audio data. Since the subscriber is properly charged for the downloaded data, the copyright owner of this data can be compensated.

As described above, in the system, the ground station 1 multiplexes video data and audio data as music program broadcast material received from the program broadcast material server 11, audio data as audio channel materials received from the audio channel program broadcast material servers 12A, 12B, and so forth, download data received from the download audio data material server 13, and data received from the GUI data server 14 and transmits the multiplexed data.

When the receiving facility 3 of each end user receives the broadcast signal, the subscriber can see a music program and a graphic screen corresponding to data received from the GUI data server 14. When the subscriber performs a predetermined operation on the graphic screen of the receiving facility 3, he or she can see each song information page. In addition, the subscriber can listen to each demonstration song. Moreover, when the subscriber performs a predetermined operation on the graphic screen of the receiving facility 3, he or she can download desired audio data to the receiving facility 3 and record the downloaded audio data in the storage device 23.

Figure 10A:
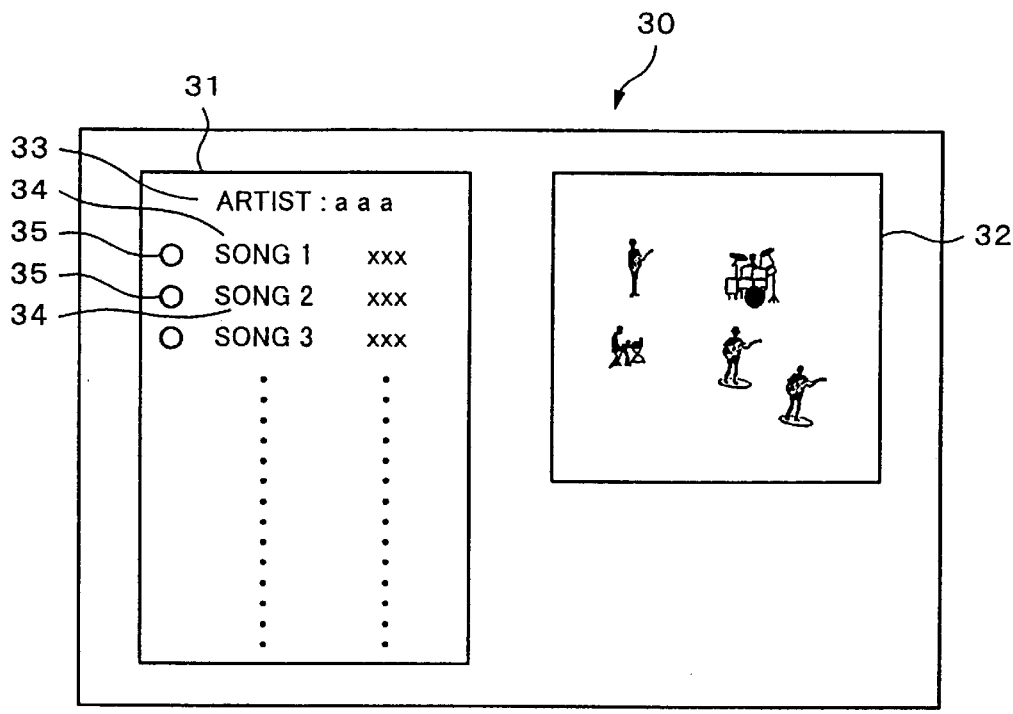
FIG. 10 is a schematic diagram of a display screen in a satellite broadcasting system for transmitting music data.

In other words, when the receiving facility 3 of each family receives a broadcast signal, a list page 30 for circulated songs is displayed on the screen of the television receiver 24 as shown in FIG. 10A. In the list page 30, a window 31 for downloadable songs and a moving picture 32 for a music program received from the program broadcast material server 11 are displayed. On the window 31, an artist name 33, downloadable song program names 34, 34, 34, . . . , and song selection buttons 35, 35, . . . are displayed.

The subscriber searches a desired song from the list page 30. To see detailed information for each song, the subscriber operates for example arrow keys of a remote commander 98 (FIG. 12) and presses a relevant song selection button 35.

Figure 10B:
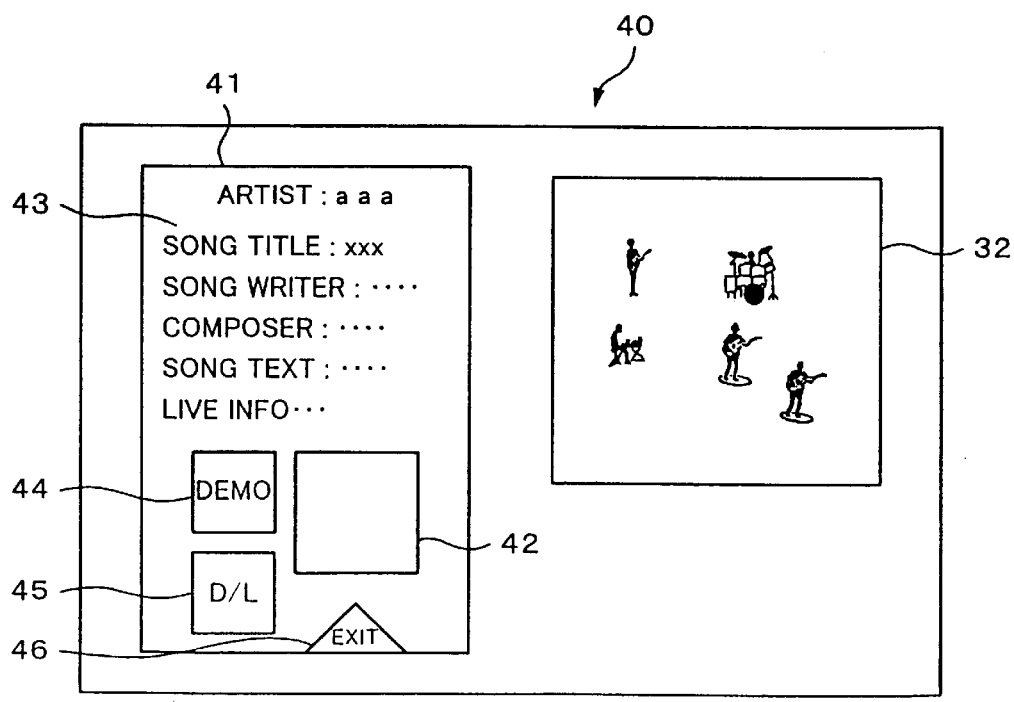

When the relevant song selection button 35 on the window 31 is pressed, a song information page 40 is displayed as shown in FIG. 10B. In each song information page, a window 41 providing detailed song information is displayed. In addition, a still picture 42 for a CD jacket for the relevant song is displayed. On the window 41, detailed song information such as an artist name, a song name, a song writer, a composer, a song text, and live information are displayed. In addition, a demonstration (demo) button 44, a download button 45, and an exit button 46 are displayed.

The demonstration button 44 allows the subscriber to listen to a demonstration song before purchasing the relevant audio data. The download button 45 allows the subscriber to download a desired song to the receiving facility and then to transmit it to the storage device 23. The exit button 46 allows the subscriber to see the previous page. The list page 30 and the information page 40 provide the subscriber with a song being circulated and detailed information with respect to the song.

When the subscriber wants to listen to a desired song, he or she operates the arrow keys and then presses the demonstration key 44. When the demonstration key 44 is pressed, an audio channel corresponding to the desired song is selected. On each audio channel, the same song is repeatedly broadcast at intervals of a predetermined time period. When the demonstration button 44 is pressed, the relevant audio channel corresponding to the song is selected. Thus, the subscriber can listen to a demonstration of the song.

When the subscriber wants to purchase the song to which he or she has listened, he or she presses the download button 45. Downloaded audio data corresponds to a song that is broadcast on an audio channel. Thus, when the download button 45 is pressed, the audio data of the selected song is downloaded to the receiving facility 3 and then recorded in the storage device 23.

When the subscriber wants to exit to the list page, he or she presses the exit button 46. When the exit button 46 is pressed, the list screen 30 shown in FIG. 10A is displayed.

In the system, the song list page 30 and each song information page 40 are displayed. The subscriber can learn about each song from the song list page 30 and each song information page 40. When the subscriber presses the demonstration button 44 on the screen, he or she can listen to a demonstration of the selected song. When the subscriber presses the download button 45, he or she can download the audio data of the selected program to the receiving facility 3 and record the audio data in the storage device 23.

Figure 11:
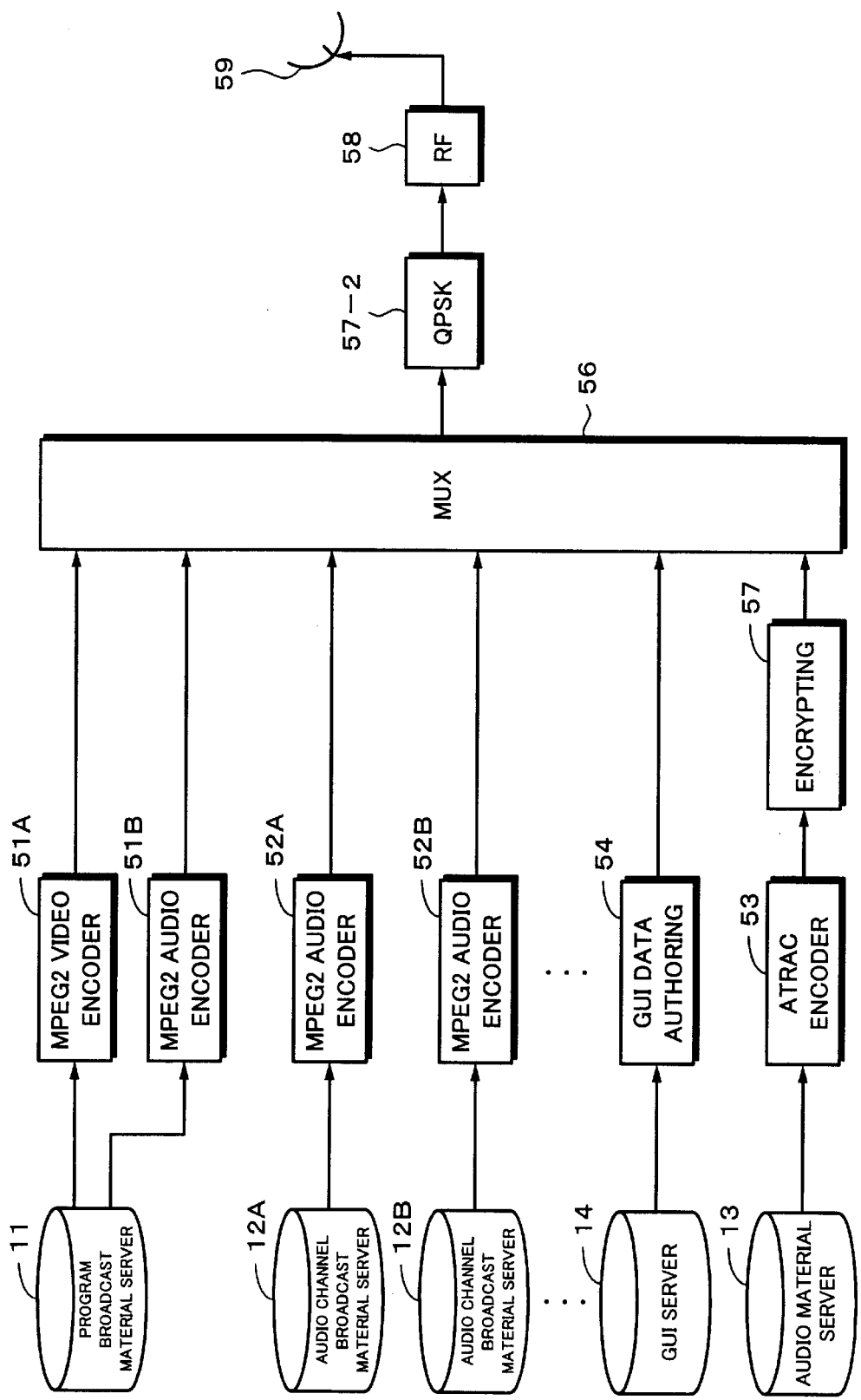
FIG. 11 is a block diagram of a transmission side of a satellite broadcasting system for transmitting music data.

FIG. 11 shows the structure of the ground station 1 of the system according to the present invention. In FIG. 11, video data received from the program broadcast material server 11 is supplied to an MPEG2 video encoder and an MPEG audio encoder 51B. Audio data received from the audio channel program broadcast material servers 12A, 12B, and so forth is supplied to MPEG audio encoders 52A, 52B, and so forth. Download audio data received from the download audio data material server 13 is supplied to an ATRAC encoder 53. Graphic user interface screen data received from the GUI data server 14 is supplied to a GUI data authoring circuit 54.

A video signal received from the program broadcast material server 11 is compressed and packetized by the MPEG2 video encoder 51A. The resultant video packets are supplied to a multiplexer 56. An audio signal received from the program broadcast material server 11 is compressed and packetized by the MPEG audio encoder 51B. The resultant audio packets are supplied to the multiplexer 56.

Audio data received from the audio channel program broadcast material servers 12A, 12B, and so forth are compressed and packetized by the MPEG audio encoders 52A, 52B and so forth in the MPEG2 audio format. The resultant audio packets are supplied to the multiplexer 56.

Download audio data received from the download audio data material server 13 is compressed and packetized by the ATRAC encoder 53 in the ATRAC format. The resultant data packets are supplied to an encrypting circuit 57. The encrypting circuit 57 encrypts the data packets. The output data of the encrypting circuit 57 is supplied to the multiplexer 56. Since the audio data is encrypted, illegal downloading and copyright infringement are prevented.

Graphic user interface screen data received from the GUI data server 14 is processed and packetized by the GUI data authoring circuit 54. The resultant data packets are supplied to the multiplexer 56.

The multiplexer 56 multiplexes video packets received from the MPEG2 video encoder 51A, audio packets received from the MPEG audio encoder 51B, audio packets received from the MPEG audio encoders 52A, 52B and so forth, data packets received from the ATRAC encoder 53 through the encrypting circuit 57, and data packets received from the GUI data authoring circuit 54.

An output signal of the multiplexer 56 is supplied to a QPSK (quadrature phase shift keying) modulating circuit 57-2. The QPSK modulating circuit 57-2 modulates transmission data with QPSK. An output signal of the QPSK modulating circuit 57-2 is supplied to a radio frequency circuit 58. The radio frequency circuit 58 converts the carrier frequency into a predetermined frequency and amplifies the power of the received data. An output signal of the radio frequency circuit 58 is transmitted to the satellite 2 through an antenna 59.

In the ground station 1, program broadcast video data and audio data are compressed in the MPEG format. Audio data on an audio channel is compressed in the MPEG audio format. Download audio data is compressed in the ATRAC format. These video data, audio data, download audio data, and GUI data are multiplexed and transmitted.

Next, the receiving facility 3 of each end user will be described.

As shown in FIG. 9, the receiving facility 3 comprises parabolic antenna 21, IRD 22, storage device 23, and television receiver 24. The storage device 23 is for example an MD recorder/player.

Figure 12:
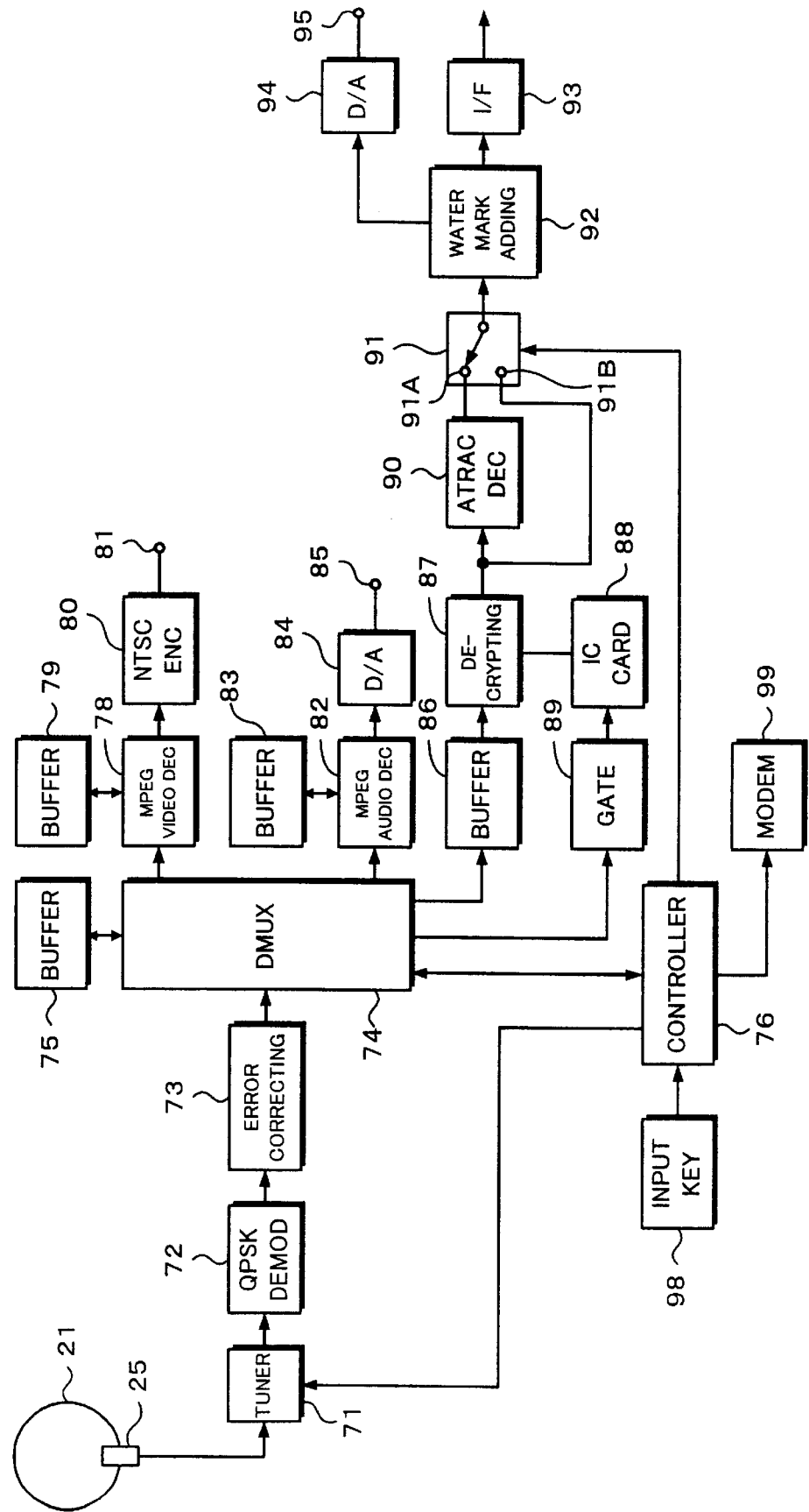
FIG. 12 is a block diagram of an integrated receiver decoder (IRD) of a satellite broadcasting system for transmitting music data.

FIG. 12 shows an example of the structure of the IRD 22. In FIG. 12, the parabolic antenna 21 receives a digital satellite broadcast signal from the satellite 2. The signal received from the parabolic antenna 21 is supplied to an LNB 25 disposed in the parabolic antenna 22. The LNB down-converts the frequency of the received signal to a predetermined frequency.

An output signal of the LNB 25 is supplied to a tuner circuit 71. The tuner circuit 71 selects a signal with the predetermined frequency from the received signal corresponding to a setup signal received from a controller 76.

An output signal of the tuner circuit 71 is supplied to a QPSK demodulating circuit 72. The QPSK demodulating circuit 72 demodulates the received signal with the QPSK and obtains a demodulated bit stream. An output signal of the QPSK demodulating circuit 72 is supplied to an error correcting circuit 73. The error correcting circuit 73 detects an error from the received signal and corrects the error.

An output signal of the error correcting circuit 73 is supplied to a demultiplexer 74. The demultiplexer 74 receives the bit stream signal from the error correcting circuit 73. The bit stream signal is temporarily stored in a data buffer memory 75. The bit stream signal stored in the buffer memory 75 is framed as a sequence of packets. The packets are separated into each data type, and a determination is made of whether each packet contains desired data.

As described above, video data and audio data for a conventional broadcast program, audio data for a plurality of audio channels, download audio data, and GUI data are transmitted from the ground station 1.

The video data has been compressed in the MPEG2 video format, and the audio data has been compressed in the MPEG audio format. The download audio data has been compressed in the ATRAC format.

The demultiplexer 74 separates the received packets into video data, audio data, download audio data, and GUI data.

The video data separated by the demultiplexer 74 is supplied to the MPEG2 video decoder 78. The MPEG2 video decoder 78 temporarily stores the input digital video signal in a buffer memory 79 so as to decode the video signal that has been compressed in MPEG2. The MPEG2 video decoder 78 decodes a component video signal.

An output signal of the MPEG2 video decoder 78 is supplied to, for example, an NTSC (National Television System Committee) analog video encoder 80. The analog video encoder 80 encodes a component video signal into an NTSC composite video signal. The resultant video signal is transmitted from an output terminal 81.

The audio data on an audio channel is supplied to an MPEG audio decoder 82. The MPEG audio decoder 82 temporarily stores the input digital audio signal in a buffer memory 83 and decodes the digital audio signal.

An output signal of the MPEG audio decoder 82 is supplied to a D/A converter 84. The D/A converter 84 converts the digital audio signal into an analog audio signal. An output signal of the D/A converter 84 is output from an output terminal 85.

The download audio data is temporarily stored to a buffer memory 86. An output signal of the buffer memory 86 is supplied to a decrypting circuit 87. As described above, the download audio data has been encrypted. A key necessary for decrypting the download audio data is generated by an IC card 88.

Download completion information is supplied from the buffer memory 86 to a gate circuit 89. In addition, information necessary for decrypting the received signal is supplied from the demultiplexer 74 to the gate circuit 89.

When audio data is downloaded, the audio data is stored in the buffer memory 86. At this point, the gate circuit 89 opens. Thus, information necessary for decrypting the audio data is supplied to the IC card 88. In response, the IC card 88 supplies a key to the decrypting circuit 87. The decrypting circuit 87 decrypts the audio data corresponding to the key received from the IC card 88. At this point, charging information is stored in the IC card 88.

An output signal of the decrypting circuit 87 is supplied to an ATRAC decoder 90. In addition, the output signal of the decrypting circuit 87 is supplied to a terminal 91B of a switch circuit 91. The ATRAC decoder 90 decodes the output signal of the decrypting circuit 87 in the ATRAC format. The ATRAC decoder 90 outputs a PCM (pulse code modulated) audio signal. An output signal (namely, the PCM audio signal) of the ATRAC decoder 90 is supplied to an input terminal 91A of the switch circuit 91.

The switch circuit 91 is controlled by the controller 76. When the switch circuit 91 is placed in the terminal 91A position, the switch circuit 91 outputs the PCM audio signal. When the switch circuit 91 is placed in the terminal 91B position, the switch circuit 91 outputs a digital audio signal that has been compressed in the ATRAC format.

An output signal of the switch circuit 91 is supplied to a water mark adding circuit 92. The water mark adding circuit 92 adds an electronic water mark to audio data so as to protect against unauthorized use.

An output signal of the water mark adding circuit 92 is supplied to a digital interface 93 corresponding to, for example, IEC958. In addition, the output signal of the water mark adding circuit 92 is supplied to a D/A converter 94. The D/A converter 94 converts the digital audio signal into an analog audio signal. The analog audio signal is output from an analog output terminal 95.

The GUI data is supplied to the controller 76. The controller 76 forms a screen for a list page, a screen for each song information page, and an EPG screen. The formed screens are written to particular areas of the buffer memory 79. Thus, a broadcast song list page, each song information page, and an EPG can be displayed.

The controller 76 controls all the processes of the IRD 22. Data is input to the controller 76 through an input key pad 98. A modem 99 is connected to the controller 76. Charging information is recorded in the IC card 88. The information recorded in the IC card 88 is transmitted to the charging server 5 through the modem 99 and the telephone line 4.

The switch circuit 91 selects either the PCM data or the ATRAC audio data. When the storage device 23 receives PCM data, the switch circuit 91 is placed in the terminal 91A position. When the storage device 23 receives ATRAC data, the switch circuit 91 is placed in the terminal 91B position. When the switch circuit 91 is placed in the terminal 91A position, the downloaded ATRAC data is supplied to the ATRAC decoder 90 which decodes the ATRAC data. The decoded data is output from the digital interface 93 through the switch circuit 91 and the water mark adding circuit 92. When the switch circuit 91 is placed in the terminal 91B position, the downloaded ATRAC data is output from the digital interface 93 through the switch circuit 91 and the water mark adding circuit 92.

Figure 13:
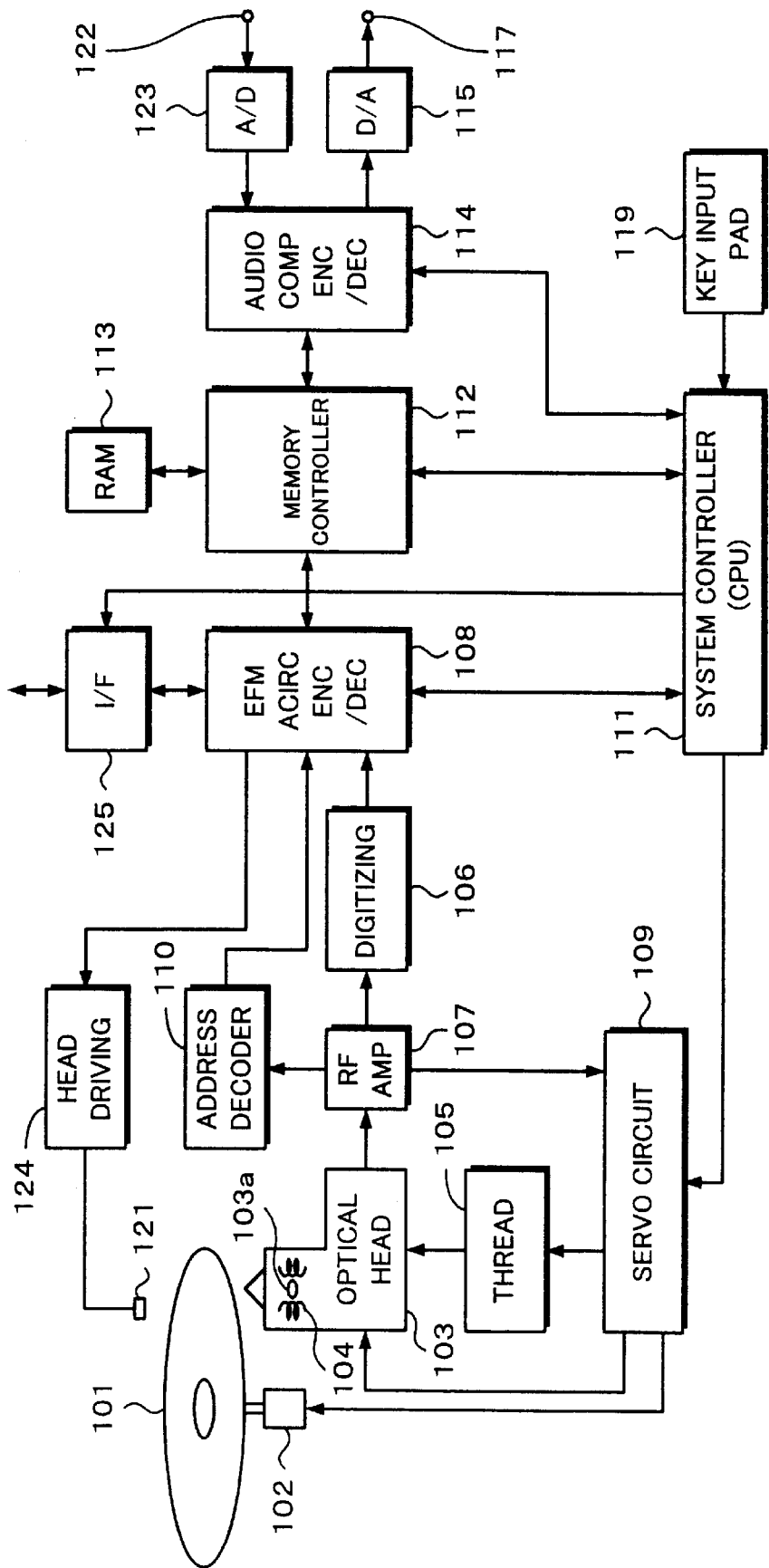
FIG. 13 is a block diagram of a storage device of a satellite broadcasting system for transmitting music data.

FIG. 13 shows an example of the structure of the storage device 23. In this example, the storage device 23 includes an MD recorder/player.

In FIG. 13, reference numeral 101 is a disc. The disc 101 is an MD that is, for example, an optical-magnetic disc with a diameter of 64 mm that is packaged in a cartridge. An optical head 103 and a magnetic head 121 are disposed for the disc 101. The optical head 103 has a laser diode, an optical system, and a detector. The laser diode radiates laser light. The optical system is composed of a polarizing beam splitter and an objective lens 103a. The detector detects reflected light. The objective lens 103a is held so that it can be moved in the radius direction of the disc and in the approaching/departing direction thereof by a two-axis device 104. The optical head 103 and the magnetic head 121 can be moved in the radial direction of the disc by a thread mechanism 105.

Information detected from the disc 101 by the optical head 103 is supplied to an RF amplifier 107. The RF amplifier 107 performs arithmetic processes for outputting signals of individual detectors of the optical head 103 and extracts a reproduction RF signal, a tracking error signal, a focus error signal, wobbled absolute position information, address information, and so forth from the output signals. The reproduction RF signal is supplied to an EFM (Eight To Fourteen Modulation) and ACICR (Advanced Cross Interleave Reed-Solomon Code) encoder/decoder portion 108. The tracking error signal received from the RF amplifier 107 is supplied to a servo circuit 109. The address information is supplied to an address decoder 110. The address decoder 110 decodes the address information and outputs an absolute position address.

The servo circuit 109 generates various servo drive signals corresponding to the tracking error signal, the focus error signal, a track jump command, a seek command, rotation detection information for the spindle motor 102, and so forth. The track jump command, the seek command, the rotation detection information, and so forth are received from the system controller 111. The two-axis device 104 and the thread mechanism 105 are controlled corresponding to such various servo drive signals so as to perform a focus controlling operation and a tracking controlling operation.

All the operations of the storage device are managed by the system controller 111. Data is input from an operation inputting portion 119 to the system controller 111.

When an audio signal is recorded, an analog audio signal is supplied from an input terminal 122 to an A/D converter 123. The A/D converter 123 digitizes the audio signal. An output signal of the A/D converter 123 is supplied to an audio compression encoder/decoder 114. The audio compression encoder/decoder 114 compresses the audio data in the ATRAC format.

An output signal of the audio compression encoder/decoder 114 is temporarily written to a RAM 113 under the control of a memory controller 112. Thereafter, the resultant audio data is supplied to an EFM and ACIRC encoder/decoder 108. The EFM and ACIRC encoder/decoder 108 adds an error correction code to the audio data. In addition, the data is modulated with the EFM. An output signal of the EFM and ACIRC encoder/decoder 108 is supplied to the magnetic head 121 through the head driving circuit 124. At this point, the optical head 103 radiates a laser beam to the disc so as to record ATRAC compressed audio data on the disc.

The MD recorder/player can directly input and record ATRAC data to the disc. ATRAC data is input through the digital interface 125 corresponding to, for example, IEC958. The ATRAC data received from the digital interface 125 is supplied to the EFM and ACIRC encoder/decoder 108. The EFM and ACIRC encoder/decoder 108 adds an error correction code to the audio data. In addition, an output signal of the EFM and ACIRC encoder/decoder 108 is supplied to the magnetic head 121 through the head driving circuit 124. At this point, the optical head 103 radiates a laser beam to the disc so as to record ATRAC compressed audio data to the disc 101. This data is modulated with the EFM.

In the reproduction mode, a record signal is reproduced from the disc 101 by the optical head 103. An output signal of the optical head 103 is supplied to an RF amplifier 107.

The RF amplifier 107 outputs a reproduction RF signal. The reproduction RF signal is supplied to the EFM and ACIRC decoder 108 through a digitizing circuit 106. The EFM and ACIRC decoder 108 performs an EFM demodulating process and an ACIRC error correcting process for the reproduction RF signal.

An output signal of the EFM and ACIRC decoder 108 is temporarily written to the RAM 113 under the control of the memory controller 112. Data is intermittently read from the optical-magnetic disc 101 by the optical head 103 at 1.41 Mbits/sec. In addition, data is intermittently reproduced from the optical head 103 to the RAM 113 at 1.41 Mbits/sec.

Data written to the RAM 113 is read at 0.3 Mbits/sec. The read data is supplied to the audio compression encoder/decoder 114. The audio compression encoder/decoder 114 performs a decompressing process for the ATRAC audio data.

An output data of the audio compression encoder/decoder 114 is supplied to the D/A converter 115. The D/A converter 115 converts the digital audio signal into an analog audio signal. The analog audio signal is output from the output terminal 117.

Data is read to or written from the RAM 113 under the control of the memory controller 112. In other words, the memory controller 112 controls a write pointer and a read pointer so as to designate an address of the RAM 113. The write pointer is incremented at 1.41 Mbits/sec. On the other hand, the read pointer is incremented at 0.3 Mbits/sec. Due to the difference between the writing bit rate and the reading bit rate, the RAM 113 always stores data. When the RAM 113 becomes full of data, the incrementing operation of the write pointer is stopped. In addition, the data reading operation for the disc 101 by the optical head 103 is stopped. However, since the incrementing operation of the read pointer is continuously performed, the reproduction of audio data does not stop.

When only the reading operation for the RAM 113 is continuously performed and the data storage amount of the RAM 113 becomes smaller than a predetermined amount, the data reading operation of the optical head 103 and the incrementing operation of the write pointer are resumed. Thus, data is stored to the RAM 113.

Since the reproduction audio signal is output through the RAM 113, even if a tracking error due to an outer disturbance takes place, the reproduction of audio data does not stop. While the RAM 113 stores data, when a correct track position is accessed, the data reading operation can be resumed without an influence of the reproduction data output.

In this system, music distribution data has been compressed in the ATRAC format. The ATRAC compressed data is transmitted with TS packets corresponding to the MPEG standard. As described above, when one TS packet is composed of 159 bytes and one PES packet is composed of eight TS packets, ATRAC data of three sound frames can be transmitted with one PES packet. Thus, the conformity of ATRAC data and PES packets is high.

In such a system, through, for example, an IEC958 optical interface, ATRAC data is transmitted from IRD 22 to the storage device 23 (such as an MD recorder/player). When ATRAC data is transmitted through the IEC958 optical interface, as shown in FIG. 8, assuming that data of 3072 bytes is placed in one PES packet, two frames of IEC958 data can be transmitted with one PES packet. Thus, the conformity of IEC958 frames and PES packets also is high.

As described with reference to FIGS. 4 and 8, a checksum code is added to ATRAC data or IEC958 data for each TS packet. For example, when ATRAC data is input through, for example, the digital interface 125, an error can be detected. Thus, while data is being downloaded, if an error in the ATRAC data is detected, a downloading operation and a recording operation can be stopped. In this case, the operation may be repeated. As described above, since music data in the ATRAC format is repeatedly broadcast, when an error is detected, a download retrying operation can be performed. In addition, with the retrying operation, data free of an error can be downloaded. Thus, a system with high reliability can be structured.

As embodiments of the present invention, a transmitting method and an example of a system corresponding thereto are described. However, the transmitting method and the system corresponding thereto are not limited to those described. Instead, the present invention can be applied to various transmitting methods and systems corresponding thereto. In the above-described embodiments, an error detection code is added to the transmission data (ATRAC data) in each TS packet. In the alternative, an error correction code may be added.

According to the present invention, transmission information, segmented into basic elements, each of which has a predetermined amount of data, is transmitted in PES packets. Each PES packet is formed with an integer number of TS packets, and the amount of data transmitted in each TS packet is determined such that an integer number of basic elements of the transmission information is placed in each PES packet. For example, when ATRAC data is transmitted, 159 bytes of the ATRAC data are placed in one TS packet. With eight TS packets, one PES packet is formed. With one PES packet, three sound frames of ATRAC data are transmitted. Thus, since an integer number of sound frames is transmitted with one PES packet, the integrity of sound frames and PES packets remains intact.

Since an error detection code or an error correction code is added to the transmission information in each TS packet, the receiving apparatus or storage device can check for an error in the transmission information. Since errors in the received data and downloaded data are detected, a particular process, such as downloading the data, can be repeated to obtain error-free data. Thus, the reliability of the system is remarkably improved.

In addition, according to the present invention, unique information with respect to the transmission information is placed in each TS packet. The unique information includes information representing that the current transmission data is the first PES packet and information representing that the current transmission data is the last PES packet. Thus, the record start position and the record end position can be easily detected. In addition, the unique information includes information indicating that the current transmission data is placed at a particular TS packet in the current PES packet. Thus, it can be determined whether data has been lost. Corresponding to the determined result, an error process can be performed.

What is claimed is:

1. A method for transmitting data in a stream of elementary stream packets, said data being segmented into basic elements with each of said basic elements containing a predetermined quantity of said data, the method comprising:

forming each of said elementary stream packets with an integer number of transport stream packets;

placing within each of said transport stream packets a quantity of said data such that an integer number of said basic elements is contained in each of said elementary stream packets; and transmitting said elementary stream packets.

2. The method of claim 1, further comprising including in each of said transport stream packets a code for detecting an error in said data.

3. The method of claim 1, further comprising including in each of said transport stream packets a code for correcting an error in said data.

4. The method of claim 1, wherein the data capacity of each of said transport stream packets is fixed.

5. The method of claim 1, wherein said data is compressed audio data and each of said basic elements is a sound group.

6. The method of claim 5, wherein said compressed audio data is ATRAC data and said transmitting comprises multiplexing said transport stream packets with other transport stream packets containing MPEG data.

7. The method of claim 6, wherein the data capacity of said transport stream packets containing ATRAC data is the same as the data capacity of the transport stream packets containing MPEG data.

8. The method of claim 7, wherein said data capacity is 188 bytes.

9. The method of claim 6, wherein said integer number of transport stream packets is 8 and said integer number of basic elements is 3.

10. The method of claim 1, wherein said data is IEC958 data and each of said basic elements is a sound group.

11. The method of claim 1, further comprising including in each of said transport stream packets indicia identifying said data, said data's organization and said data's manner of transmission.

12. The method of claim 11, wherein said stream of elementary stream packets corresponds to a sound recording and further comprising including in the first elementary stream packet of said stream indicia identifying said packet as the first elementary stream packet of said recording.

13. The method of claim 11, wherein said stream of elementary stream packets corresponds to a sound recording and further comprising including in the last elementary stream packet of said stream indicia identifying said packet as the last elementary stream packet of said recording.

14. The method of claim 11, further comprising including, within each transport stream packet of an elementary stream packet, indicia identifying the position of said transport stream packet within said elementary stream packet.

15. The method of claim 1, wherein said transmitting comprises broadcasting said elementary stream packets and said data comprises music for downloading onto a recording medium.

16. The method of claim 15, wherein said recording medium is an optical disc.

17. The method of claim 15, wherein said broadcasting comprises broadcasting said elementary stream packets from a satellite to a recording device of an end user.

18. The method of claim 17, further comprising charging said end user for downloading said music.

19. A system for transmitting data in a stream of elementary stream packets, said data being segmented into basic elements with each of said basic elements containing a predetermined quantity of said data, the system comprising:
  means for forming each of said elementary stream packets with an integer number of transport stream packets;
  means for placing within each of said transport stream packets a quantity of said data such that an integer number of said basic elements is contained in each of said elementary stream packets; and
  means for transmitting said elementary stream packets.

20. The system of claim 19, further comprising means for including in each of said transport stream packets a code for detecting an error in said data.

21. The system of claim 19, further comprising means for including in each of said transport stream packets a code for correcting an error in said data.

22. The system of claim 19, wherein the data capacity of each of said transport stream packets is fixed.

23. The system of claim 19, wherein said data is compressed audio data and each of said basic elements is a sound group.

24. The system of claim 23, wherein said compressed audio data is ATRAC data and said means for transmitting comprises means for multiplexing said transport stream packets with other transport stream packets containing MPEG data.

25. The system of claim 24, wherein the data capacity of said transport stream packets containing ATRAC data is the same as the data capacity of the transport stream packets containing MPEG data.

26. The system of claim 25, wherein said data capacity is 188 bytes.

27. The system of claim 24, wherein said integer number of transport stream packets is 8 and said integer number of basic elements is 3.

28. The system of claim 19, wherein said data is IEC958 data and each of said basic elements is a sound group.

29. The system of claim 19, further comprising means for including in each of said transport stream packets indicia identifying said data, said data's organization and said data's manner of transmission.

30. The system of claim 29, wherein said stream of elementary stream packets corresponds to a sound recording and further comprising means for including in the first elementary stream packet of said stream indicia identifying said packet as the first elementary stream packet of said recording.

31. The system of claim 29, wherein said stream of elementary stream packets corresponds to a sound recording and further comprising means for including in the last elementary stream packet of said stream indicia identifying said packet as the last elementary stream packet of said recording.

32. The system of claim 29, further comprising including, within each transport stream packet of an elementary stream packet, indicia identifying the position of said transport stream packet within said elementary stream packet.

33. The system of claim 19, wherein said transmitting comprises means for broadcasting said elementary stream packets and said data comprises music for downloading onto a recording medium.

34. The system of claim 33, wherein said recording medium is an optical disc.

35. The system of claim 33, wherein said broadcasting comprises means for broadcasting said elementary stream packets from a satellite to a recording device of an end user.

36. The system of claim 35, further comprising means for charging said end user for downloading said music.

37. A method for transmitting ATRAC data in a stream of MPEG data, said method comprising:
  forming elementary stream packets with an integer number of transport stream packets, said transport stream packets having a data capacity equal to that used for the transmission of said MPEG data;
  placing within each of said transport stream packets a quantity of ATRAC data such that an integer number of sound frames of ATRAC data is contained in each of said elementary stream packets; and
  transmitting said transport stream packets with transport stream packets containing said MPEG data.

38. The method of claim 37, further comprising placing within each of said transport stream packets containing ATRAC data a code for detecting an error in said ATRAC data.

39. A system for transmitting ATRAC data in a stream of MPEG data, said system comprising:
- means for forming elementary stream packets with an integer number of transport stream packets, said transport stream packets having a data capacity equal to that used for the transmission of said MPEG data;
- means for placing within each of said transport stream packets a quantity of ATRAC data such that an integer number of sound frames of ATRAC data is contained in each of said elementary stream packets; and
- means for transmitting said transport stream packets with transport stream packets containing said MPEG data.

40. A system as in claim 39, further comprising means for placing within each of said transport stream packets containing ATRAC data a code for detecting an error in said ATRAC data.

41. A method for transmitting data in a stream of elementary stream packets, said data being segmented into basic elements with each of said basic elements containing a predetermined quantity of said data, the method comprising:
- forming each of said elementary stream packets with an integer number of transport stream packets;
- placing within each of said transport stream packets a quantity of said data such that an integer number of said basic elements is contained in each of said elementary stream packets;
- placing within each of said transport stream packets a code for detecting an error in said data; and
- transmitting said elementary stream packets.

42. A system for transmitting data in a stream of elementary stream packets, said data being segmented into basic elements with each of said basic elements containing a predetermined quantity of said data, the system comprising:
- means for forming each of said elementary stream packets with an integer number of transport stream packets;
- means for placing within each of said transport stream packets a quantity of said data such that an integer number of said basic elements is contained in each of said elementary stream packets;
- means for placing within each of said transport stream packets a code for detecting an error in said data; and
- means for transmitting said elementary stream packets.

* * * * *

UNITED STATES PATENT AND TRADEMARK OFFICE
CERTIFICATE OF CORRECTION

PATENT NO. : 6,650,659 B1
DATED : November 18, 2003
INVENTOR(S) : Ichiro Hamada

It is certified that error appears in the above-identified patent and that said Letters Patent is hereby corrected as shown below:

<u>Title page,</u>
Item [57], ABSTRACT, "stream is disclosed" should read -- stream are disclosed --.

<u>Column 4,</u>
Line 31, "is" should read -- are --.

<u>Column 5,</u>
Line 50, "byte" should read -- bytes --.

<u>Column 6,</u>
Line 19, "bytes" should read -- byte --.

<u>Column 7,</u>
Line 8, "are" should read -- is --.

<u>Column 17,</u>
Line 21, insert -- said -- before "transport".
Line 22, insert -- said -- before "basic".

Signed and Sealed this

Tenth Day of February, 2004

JON W. DUDAS
*Acting Director of the United States Patent and Trademark Office*